(12) United States Patent
Eccles et al.

(10) Patent No.: US 6,580,179 B2
(45) Date of Patent: Jun. 17, 2003

(54) RAM AIR TURBINE WITH HIGH POWER DENSITY GENERATOR AND SELF-CONTAINED FLUID COOLING LOOP

(75) Inventors: Steven R. Eccles, Torrance, CA (US); Wayne G. Schindler, Huntington Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/878,066

(22) Filed: Jun. 7, 2001

(65) Prior Publication Data

US 2003/0011198 A1 Jan. 16, 2003

(51) Int. Cl.[7] ............................... H02P 9/04; F03D 9/00
(52) U.S. Cl. ......................... 290/44; 244/138; 416/142
(58) Field of Search ............................ 290/44; 244/38; 416/142

(56) References Cited

U.S. PATENT DOCUMENTS

| 24,179 A | 5/1859 | Breaux et al. |
|---|---|---|
| 3,690,410 A | 9/1972 | Sieghartner |
| 4,742,976 A * | 5/1988 | Cohen ........................... 244/58 |
| 4,991,796 A | 2/1991 | Peters et al. .................. 244/58 |
| 5,101,128 A | 3/1992 | Veronesi et al. |
| 5,174,719 A * | 12/1992 | Walsh ......................... 416/142 |
| 5,261,784 A | 11/1993 | Weber ......................... 415/88 |
| 5,655,359 A | 8/1997 | Campbell et al. |
| 6,092,360 A | 7/2000 | Hoag et al. |
| 6,127,758 A | 10/2000 | Murry et al. |
| 6,331,099 B1 * | 12/2001 | Eccles ......................... 416/142 |

FOREIGN PATENT DOCUMENTS

GB          2 096 409          10/1982

* cited by examiner

Primary Examiner—Nestor Ramirez
Assistant Examiner—Iraj A Mohandesi
(74) Attorney, Agent, or Firm—William J. Zak, Jr., Esq.

(57) ABSTRACT

A ram air turbine system provides liquid cooling of its generator by employing a closed loop liquid cooling line originating from a pump in the gearbox of the system. In the preferred embodiment the pump may be a pitot pump to which gearbox lubricating oil may be channeled along a trough that is located in the gearbox. At least a portion of the trough is immersed in the oil which travels along the trough toward the pump in response to turbine shaft rotation. The oil is directed into a cooling jacket which is integral to the generator and then to a heat exchanger exposed to airflow. The oil is then returned to the gearbox.

26 Claims, 4 Drawing Sheets

RAM AIR TURBINE WITH HIGH POWER DENSITY GENERATOR AND SELF-CONTAINED FLUID COOLING LOOP

BACKGROUND OF THE INVENTION

Ram Air Turbines (RATs) can be used in commercial aviation as emergency power systems. They typically have a turbine with a rotating hub and a plurality of blades. Initially in flight they are stowed in a compartment of the aircraft, covered by a compartment door. When called as a source of emergency or supplemental power, they commonly swing out through a narrow door opening.

Commercial aircraft manufacturers install ram air turbines (RATs) as an emergency form of power when the main engine generators (and/or hydraulic pumps) are not operating. When called upon for electrical power, the RAT is deployed into the airstream and functions similar to windmills by extracting energy from the flowing air along the aircraft in flight. As commercial aircraft become more complex and use more electrical power, the power generating requirements of the RAT have also increased. While technological improvements have made it possible to generate significantly more electrical power in a turbine-generator that is about the same size as prior lower power RATs, the amount of heat generated increases roughly in proportion to the increase in power capability. Therefore, the heat dissipation required to maintain a higher power RAT has also increased. In the past, the lower power RATs have been cooled by deploying the generator in an open type configuration and locating it at the turbine end of the RAT so that ambient airflow in the airstream of the aircraft can directly cool the windings and rotor of the generator. However, with heat dissipation requirements rising as much as five fold or more, ambient airflow cooling is no longer sufficient to maintain the temperature of the generator at an acceptable level. Moreover, in recent years, aircraft manufacturers have required sealed generators so that internal components and electrical circuits are protected against severe environmental conditions. Sealed generators exacerbate the cooling problem because the airflow cannot directly contact the interior of the generator. A sealed RAT generator on the Boeing 777 aircraft employs cooling fins on the exterior housing of the generator. However, that generator produces only about 7.5 Kilowatts at 4,000 RPM. Newer RAT generators will be required to produce up to about 50 Kilowatts at 12,000 RPM by using a gearbox between the RAT turbine and the RAT generator. The commensurate increase in generated heat (i.e., about seven fold) makes it imperative to provide more effective generator cooling than is practical using ambient airflow. Thus, there is a need to improve generator cooling in ram air turbine systems having higher power density generators that will be deployed in future aircraft.

U.S. Pat. No. 6,127,758, Ram Air Turbine System, is for a ducted ram air turbine where an output shaft drives both an electrical generator and a turbocompressor all within a pod. The term "pod" typically refers to an auxiliary assembly which attaches under the wings of military aircraft, similar to munitions but can be anything from an extra fuel tank to antenna jamming devices.

This patent refers to cooling of the electronic equipment within the pod by three different methods. The first method is to allow a portion of the ram air to enter the electronics cavity of the pod and passively cool the electronic equipment. The second method is to direct the cool ram air through a liquid cooling loop heat exchanger, where the coolant provides a heat sink for the electronic equipment. The third method is where ram air is expanded through the turbine side of the turbocompressor. This cooled air is then directed through the same liquid cooling loop heat exchanger. For the liquid cooling loop in this patent to work there does need to be some type of pump in the cooling loop to circulate the fluid, but no mention of pump is made in the patent. Moreover, the liquid cooling loop is independent of the ram air turbine.

U.S. Pat. No. 6,092,360, Ram Air Turbine System, teaches a passive cooling system where ambient air is used to cool an auxiliary power unit (APU). This patent outlines how air is drawn into the auxiliary power unit compartment of an aircraft, passing through the unit, then ducted overboard. The ambient air is moved by a device called an eductor, which uses APU exhaust flow to draw the ambient air into the compartment.

U.S. Pat. No. 24,179, Electric Generating And Air Cooling System, is a complicated electrical generating system. This patent refers to cooling a generator, but only passively by air blowing over the generator housing. To move the cooling air over the generator housing, a fan is affixed to the end of the rotating generator shaft. There is a ram air cooled heat exchanger described in the patent, but it is used to cool the hydraulic fluid of the system, not a liquid cooling loop.

SUMMARY OF THE INVENTION

In order to supply adequate cooling to the higher power RAT generator, this invention provides a self-contained cooling loop. This cooling loop includes a pump, heat exchanger, and cooling jacket integral to the generator housing. The cooling fluid may be the lubrication oil used within the gearbox that provides the substantially increased rotation rate of the generator.

The cooling is self-generating and independent from other aircraft systems. In the illustrated embodiment, a pitot pump within a gearbox may be used to circulate the oil in an active coolant loop. Pitot pumps are seldom used in gearbox lubrication systems, as it is more common to employ a positive displacement pump such as a gear pump or a gerotor type pump. A pitot pump is the preferred pump because of the possible cold starting conditions and the low flow requirement within the cooling loop. However, other pumps of suitable size and configuration could also be used as contemplated herein. The oil is first moved through the generator to remove excess heat, then flows through a heat exchanger where the ram air flows through to extract the heat.

These and other features, aspects and advantages of the present invention will become better understood with reference to the following description, drawings and claims.

DETAILED DESCRIPTION OF THE INVENTION

Figure 1:
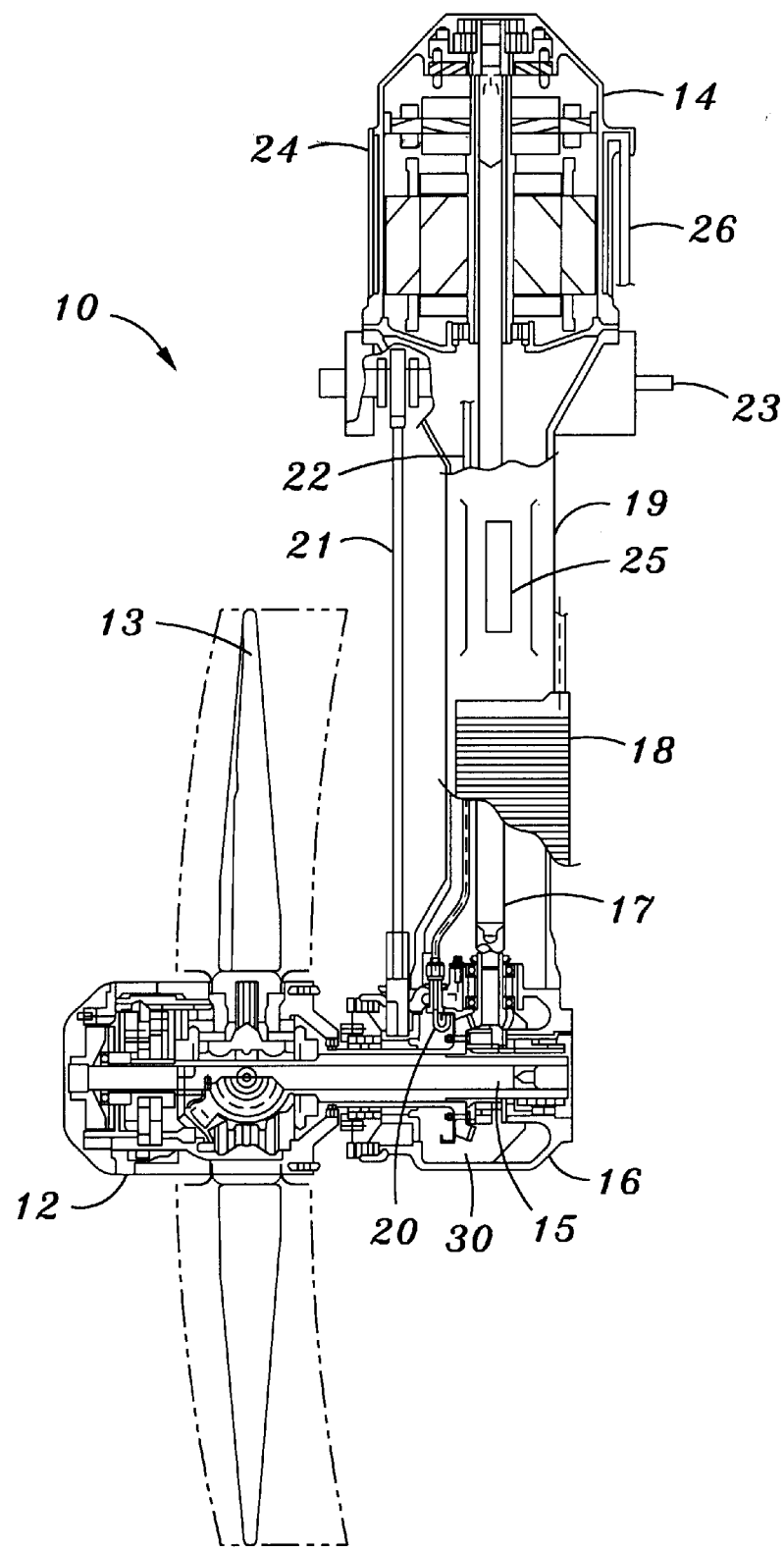
FIG. 1 is a partially cross-sectioned side view of a preferred embodiment of the invention in its deployed position.

The present invention comprises a ram air turbine and generator having a self-contained cooling loop, which requires minimum maintenance. In the preferred embodiment, it is comprised of a pitot pump which develops approximately 0.60 GPM at 30 PSI. The oil flows through tubing to and from the generator. Upon entering the generator housing, the oil flows around a spiral passage within a housing jacket. Heat is transferred from the generator main stator to the oil. The oil then flows through a strut-mounted heat exchanger which is sized for the required heat dissipation. Upon leaving the heat exchanger, the oil is reintroduced into the sump of the gearbox.

The use of a pump and a self-contained fluid cooling loop to actively cool a generator of a ram air turbine, where the pump is activated by the turbine itself, is clearly distinguishable over the prior art.

Referring to the accompanying figures, it will be seen that a ram air turbine (RAT) 10 comprises a turbine 12 having a plurality of blades 13. When deployed into the airstream, turbine 12 produces a rotation of a turbine shaft 15 connected to a gearbox 16 which, in turn, produces a high speed rotation of a generator shaft 17 of a generator 14. Generator 14 and gearbox 16 may be integrally connected through an elongated strut 19. Along the exterior of strut 19, located toward gearbox 16 may be a heat exchanger 18 which is exposed to the airstream. The lower portion of gearbox 16 forms an oil sump 30.

Figure 2:
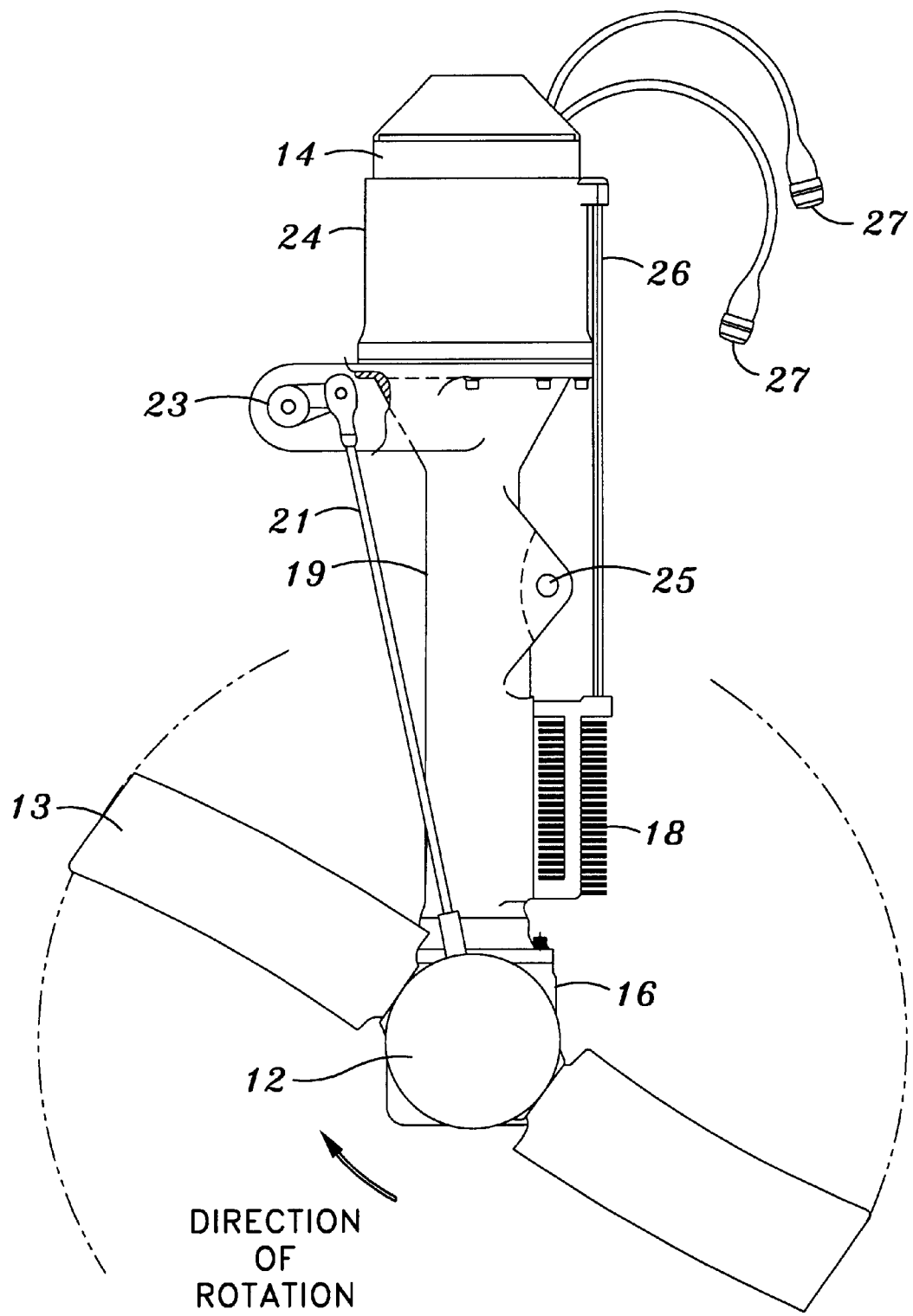
FIG. 2 is a front view of the preferred embodiment.

The RAT 10 is shown in FIGS. 1 and 2 in its deployed position with the strut 19 fully rotated to expose turbine 12 and blades 13 to the high speed airstream. An index pin 21, pivot 23 and deployment lug 25 are employed in a well-known manner to position the RAT 10 in its deployed position. A pair of electrical connectors 27 may be used to connect the output of generator 14 to appropriate aircraft electrical systems.

Figure 3:
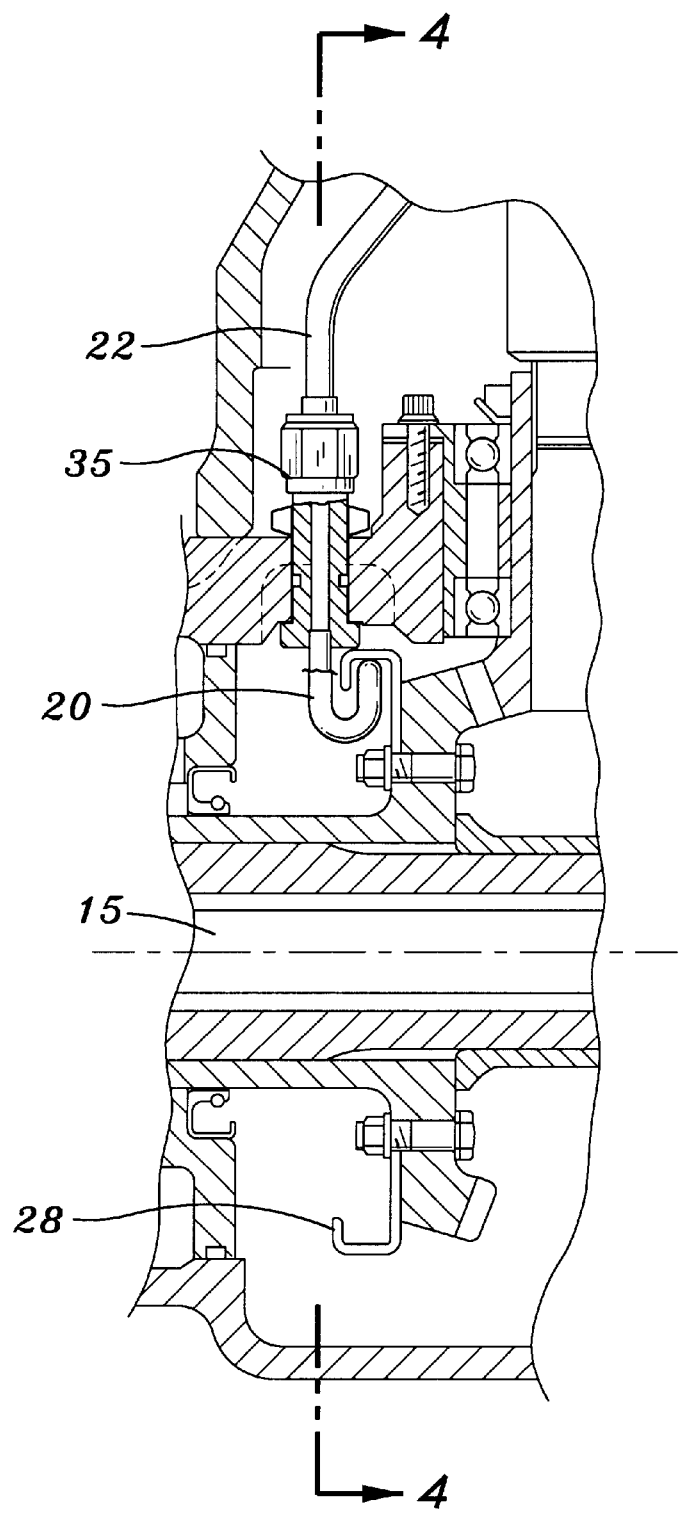
FIG. 3 is an enlarged view of the pitot pump and oil trough of the preferred embodiment.
Figure 4:
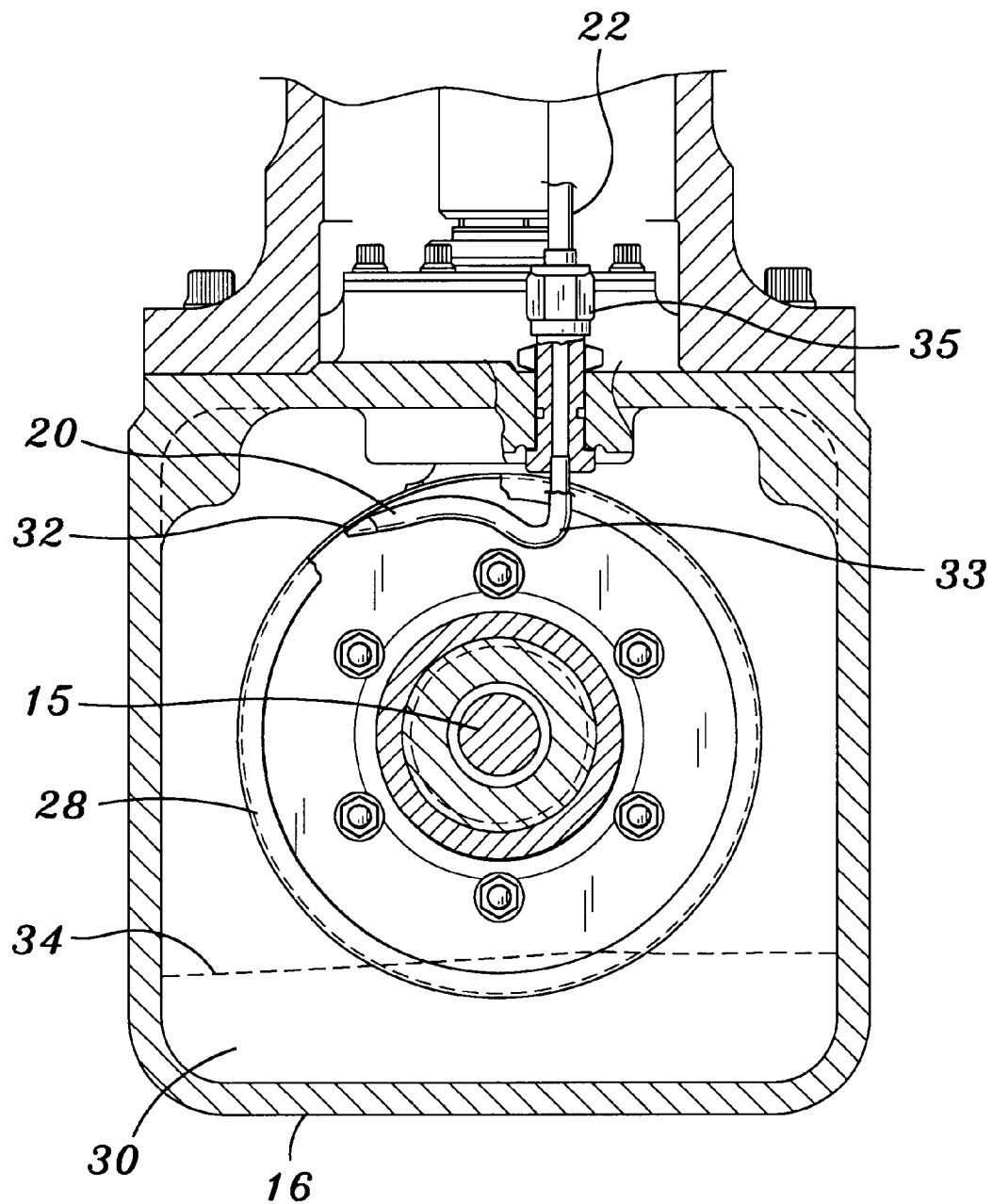
FIG. 4 is a sectional view taken along lines 4—4 of FIG. 3.

The inventive oil cooling system of the illustrated embodiment comprises a pitot pump 20 positioned in a trough 28 as seen best in FIGS. 3 and 4. Trough 28 is, in the illustrated embodiment, an annular member having a semi-rectangular cross-section. It will be evident that troughs of other shape may be employed as well. Trough 28 is positioned in substantially concentric relation to shaft 15 and at least partially below oil level 34 (see FIG. 4) so that rotation of shaft 15 causes oil to travel toward pitot pump 20.

Pitot pump 20 comprises an elongated tube or conduit 33 which terminates in a tapered open end 32. Oil in trough 28 enters the open end 32 and expands through the taper thereby forming a pressure differential which forces the oil to flow through the tube or conduit 33. In FIG. 4, the trough 28 is shown partially cut away to reveal the entire pitot tube 20 which is secured to the gearbox through a suitable sealing connector 35.

The cooling system further comprises a first oil line 22 to transfer oil from conduit 33 of pitot pump 20 to a cooling jacket 24 which is helically wound around generator 14. Also included is a second oil line 26 which transfers the oil from the cooling jacket 24 to the heat exchanger 18 before the oil is returned to the oil sump 30.

It will be apparent that the circulating oil, propelled by the rotation of shaft 15 and the action of pitot pump 20, removes heat from generator 14 as the oil flows through the cooling jacket 24. This heat is then removed from the oil in heat exchanger 18 which is, in turn, cooled by the impinging airstream. Moreover, it will be seen that the cooling system of the present invention may be configured as a closed loop system where oil in the gearbox sump is recirculated to remove heat from the generator while also providing lubrication to the gears in gearbox 16. Thus, the present invention provides an isolated oil-based cooling system for a RAT and which can be an effective heat removal apparatus even for sealed, high power generators which could not be adequately cooled by passive cooling in the airstream.

Those having skill in the relevant arts, will understand that the invention has been described herein by way of an illustrative embodiment. However, it will be apparent that there are numerous modifications and additions which may be made to that embodiment. By way of example, while the invention has been described in conjunction with a pitot pump for circulating the cooling oil, other types of pumps could also be employed. Moreover, while it may be advantageous to use the gearbox oil to cool the generator, other fluids could also be used to provide cooling. Therefore, the scope of the invention herein is limited only by the appended claims and their equivalents.

We claim:

1. A ram air turbine system for generating supplementary electrical power in an aircraft when the system is deployed into a air stream; the system comprising: a turbine having blades in said air stream for rotating a first shaft; a generator having a second shaft; a gearbox having a plurality of gears responsive to rotation of said first shaft for rotating said second shaft at a rate that is greater than the rate of rotation of said first shaft; said gearbox having an oil sump that is at least partially filled with oil; a pump in fluid communication with said oil sump and a conduit connected to said pump for conveying said oil to said generator for cooling said generator, wherein a heat exchanger deployed in said airstreams for removing heat from said oil and returning the oil to the pump, a cooling jacket in contact with said generator, said cooling jacket having a conduit for carrying said cooling oil, a trough in said gearbox, said trough being at least partially submerged in said oil in said sump for channeling oil to said pump.

2. The system recited in claim 1, wherein said pump comprises a pitot pump.

3. The system recited in claim 1, wherein said trough comprises an annular channel mounted concentrically relative to said first shaft.

4. The system recited in claim 3, wherein said trough comprises a cross-section in the form of a partial rectangle.

5. The system recited in claim 1, further comprising a strut interconnecting said gearbox and said generator and enclosing said conduit.

6. The system recited in claim 5, further comprising a deployment lug formed on said strut for selective deployment of said turbine into said airstream.

7. A ram air turbine system for selective deployment from an aircraft into an adjacent airstream for generating electrical power for use in the aircraft; the system comprising:
  a turbine for rotating a first shaft in response to said airstream;
  a sealed generator having a second shaft;
  a gearbox connected between said turbine and said generator for rotating said second shaft;
  a pump connected to a closed loop line for transferring a cooling fluid to said generator; and
  a strut interconnecting said generator and said gearbox and substantially enclosing said closed loop line.

8. The system recited in claim 7, further comprising a heat exchanger in the path of said closed loop line and exposed to said airstream for removing heat from said cooling fluid, said heat being imparted to said cooling fluid by said generator.

9. The system recited in claim 8, further comprising a cooling jacket in contact with said generator, said cooling jacket having a conduit for carrying said cooling fluid.

10. The system recited in claim 8, wherein said pump comprises a pitot pump.

11. The system recited in claim 10, wherein said cooling fluid comprises a lubricating oil contained in a sump in said gearbox.

12. The system recited in claim 11, further comprising a trough in said gearbox, said trough being at least partially submerged in said oil in said sump for channeling oil to said pitot pump.

13. The system recited in claim 12, wherein said trough comprises an annular channel mounted concentrically relative to said first shaft.

14. The system recited in claim 13, wherein said trough comprises a cross-section in the form of a partial rectangle.

15. A ram air turbine system for generating supplementary electrical power in an aircraft when the system is deployed into the airstream; the system comprising:

a turbine having blades in said airstream for rotating a first shaft;

a generator having a second shaft;

a gearbox having a plurality of gears responsive to rotation of said first shaft for rotating said second shaft at a rate that is greater than the rate of rotation of said first shaft; said gearbox having an oil sump that is at least partially filled with oil;

a pump in fluid communication with said oil sump and a conduit connected to said pump for conveying said oil to said generator for cooling said generator;

a cooling jacket in contact with said generator, said cooling jacket having a tube for carrying said cooling oil;

a trough in said gearbox, said trough being at least partially submerged in said oil in said sump for channeling oil to said pump; and a strut interconnecting said gearbox and said generator and enclosing said conduit.

16. The system recited in claim 15, wherein said pump comprises a pitot pump.

17. The system recited in claim 15, further comprising a deployment lug formed on said strut for selective deployment of said turbine into said airstream.

18. The system recited in claim 15, wherein said generator is sealed.

19. A ram air turbine system for deployment from an aircraft to generate electrical power for the aircraft from the airstream adjacent the aircraft; the system comprising:

a turbine for producing regulated mechanical energy from said airstream;

a generator for producing said electrical power from said mechanical energy; and a liquid cooling apparatus activated by said turbine for cooling said generator.

20. A method for cooling a sealed generator of a ram air turbine system, the system having a deployable turbine and the generator for producing electrical power for an aircraft in response to airstream flow adjacent the aircraft; the method comprising the steps of:

a) providing a cooling fluid source;

b) pumping the cooling fluid through a conduit;

c) placing the conduit in contact with the generator;

d) passing the conduit through a heat exchanger exposed to said airstream; and e) returning said cooling fluid to said source.

21. The method recited in claim 20, comprising the step of:

locating said source between said turbine and said generator.

22. The method recited in claim 21, comprising the step of using said turbine to carry out said pumping step.

23. The method recited in claim 22, comprising the steps of:

providing a gearbox between said turbine and said generator; and integrating said source into said gearbox.

24. The method recited in claim 23, further comprising the step of locating a pump in said gearbox to carry out said pumping step.

25. The method recited in claim 24, further comprising the step of using said cooling fluid as lubrication in said gearbox.

26. The method recited in claim 20, wherein step c) comprises the further step of wrapping said conduit around said generator as an integral cooling jacket.

* * * * *